June 23, 1964 A. YOUSSOUFIAN 3,138,041

MACHINE TOOL

Original Filed Dec. 26, 1957

United States Patent Office 3,138,041
Patented June 23, 1964

3,138,041
MACHINE TOOL
Ara Youssoufian, Geneva, Switzerland, assignor to Société Genevoise d'Instruments de Physique, Geneva, Switzerland, a firm of Switzerland
Continuation of application Ser. No. 705,414, Dec. 26, 1957. This application June 22, 1961, Ser. No. 118,973
3 Claims. (Cl. 77—4)

This is a continuation of my application Serial No. 705,414 filed December 26, 1957 and now abandoned in favor of the present application.

My invention relates to metalworking machine tools and more particularly to a device for facilitating the operation of such machine tools.

There are machine tools prior known which comprise a traversable member, and at least two means for moving said member including a hydraulic drive means consisting at least of a cylinder and a piston slidable but not rotatable in said cylinder, and a nut fixed rotatably to said traversable member, said nut being threaded on a rod rigid with said piston so that when said hydraulic drive means is actuated said piston selectively slides in the one or the other direction within said cylinder and carries with it said nut threaded on it, said nut in its turn carrying with it said traversable member as it is fixed to it, and when said piston is locked in said cylinder, and the nut is rotated by suitable means said traversable member again is carried with said nut traversing with respect to said piston and rod.

In such prior known machine tools it was often encountered that said nut after a plurality of adjustments of said traversable member in which accruing adjustments toward primarily one or the other end of said threaded part of the piston rod took place caused the nut to be jammed and caused severe damage to the adjustment means.

It is therefore the principal object of the instant invention to provide means to caution the operator of the machine tool of a dangerous position of said nut, which operator may be a human workman or an automatic control as known in the art.

It is a further object of the invention to provide a returning or restoring means for said nut which assures that said nut is returned in a safe position regardless on which end of said threaded part of the piston rod said nut was suspected to jam.

Accordingly it is the main feature of the invention that means are provided to indicate when said nut in turning has reached a point on said piston rod located at predetermined distance apart from one of the ends of the threaded part of said piston rod.

It is a further feature of the invention that means are provided to rotate said nut in such a direction that it shifts away from the adjacent end of said threaded part of the piston rod.

Figure 1:
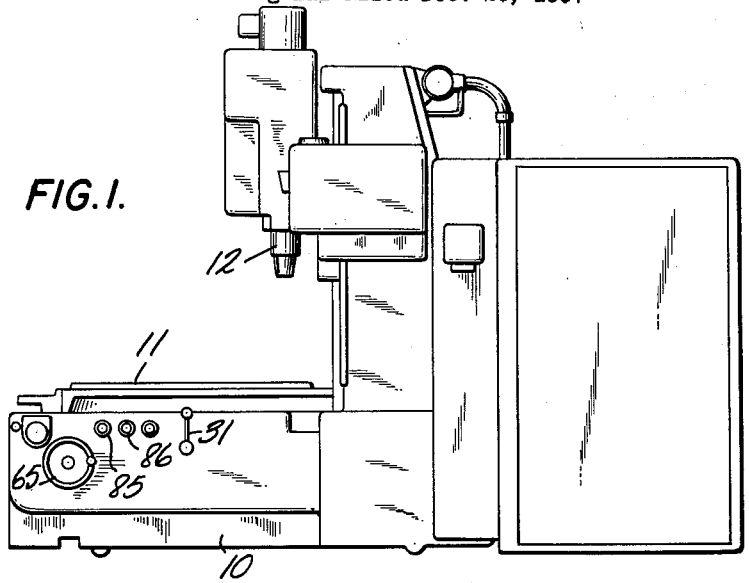
Figure 2:
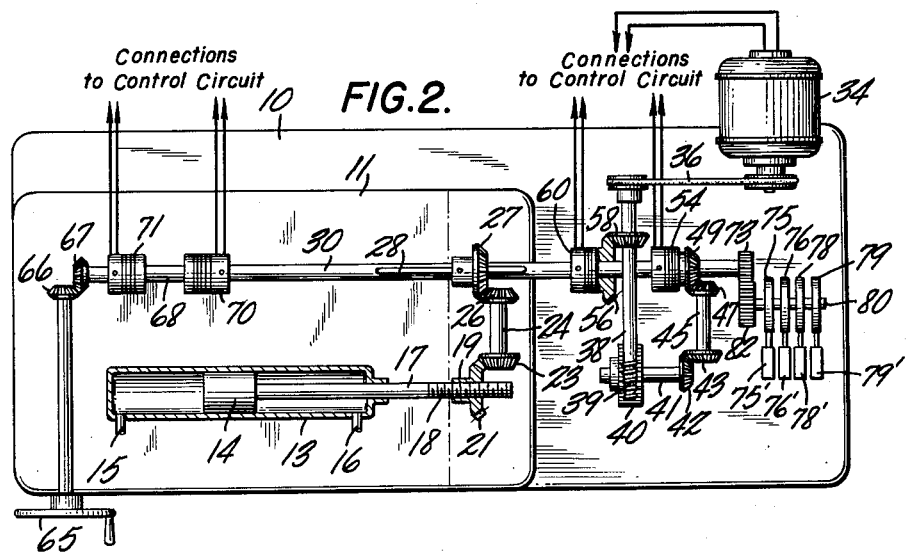
Figure 3:
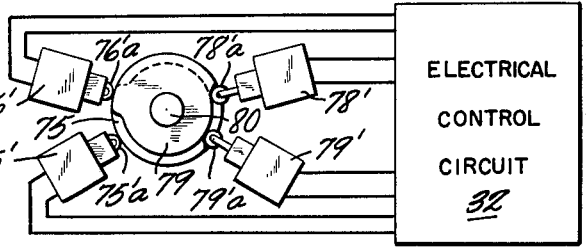

Other objects, features and advantages of the invention will become apparent from the following detailed description of a specific embodiment shown in the accompanying drawing in which FIG. 1 is a side elevation view of a machine tool in accordance with the invention;

FIG. 2 is a schematic view of the different gearings controlling the movement of the traversable member and of the returning mechanism for the nut and FIG. 3 is a schematic presentation of cam means for actuating switches needed to control certain features of the invention.

While the present invention will be described as applied to a jig-boring and milling machine, it will be understood that the invention is applicable to other machine tools in which a traversable member is provided.

According to the drawings the invention is illustrated as applied to a jig boring and milling machine having a stationary base 10 on which are mounted guide ways for a traversable element, movable relative to the machine base and other machine elements to predetermined operative positions, as for example, a table 11 for mounting workpieces thereon which may be accurately positioned automatically or semi-automatically as known per se. The machine tool is further provided with a spindle head 12 capable of vertical and horizontal traverse as known per se and relative to which the table 11 is accurately positioned for positioning work, not shown, in position for machining operations thereon.

The invention is shown to be applied to the table 11 of the machine tool which is provided with a power traverse unit providing rapid power traverse of the table approximately to preselected operative positions and then is finally accurately positioned by electromechanical means hereinafter described. The machine tool is provided with a hydraulic power traverse unit comprising a hydraulic cylinder 13 fixed to the base 10 by means, not shown, so that the table 11 is movable relative thereto. A piston 14 is reciprocably mounted internally of the cylinder and is capable of reciprocable movement in the cylinder under the action of hydraulic fluid controlled by a lever 31 (FIG. 1) and provided through conduits 15, 16 at opposite ends of the cylinder from a hydraulic fluid power source, not shown, to reciprocate the piston 14 and immobilize it after reaching roughly the desired position. Care is taken that said piston 14 cannot rotate within the cylinder.

The piston 14 is provided with a piston rod 17 extending axially outwardly of the cylinder 13 at one end thereof and which is connected to the table 11 by means, hereinafter described to traverse the table linearly, rapidly, and variably under control of the piston 14. The piston rod 17 is provided with a micrometric thread 18 on a threaded portion thereof at an end opposite to the end on which the piston is mounted. An internally threaded nut 19 is mounted for axial travel on the rod 17 and is provided with a flange portion having peripheral teeth forming a beveled pinion gear 21 cooperative with a transmission drive comprising another bevel gear 23 fixed on a shaft 24 on which is mounted a third bevel gear 26 which is rotatably driven from a gear 27 slidable axially on splines 28 of a shaft 30 rotatably driven for rotatably driving the gear 27. The nut 19 and transmission gears 23, 26 and shaft 24 are mounted beneath the table 11 and are capable of moving therewith when the table is traversed under control of the piston 14.

The hydraulically controlled portion of the traverse of the table 11 towards a desired preselected position thereof is obtained by application of hydraulic fluid under pressure on a side of the piston 14 depending upon the direction of travel desired. It is readily apparent that the traverse takes place rapidly or at a variable speed in accordance with delivery of fluid under pressure to the cylinder 13 by a known hydraulic power source, as for example a pump, not shown. Control of the hydraulic power source is carried out by a lever 31 on the operator's side of the machine.

During hydraulic powered traverse of the table the nut 19 and the heretofore mentioned transmission gears are not rotatably driven and are simply carried along with the movement of the table. After reaching the desired position the piston 14 is immobilized by hydraulic locking thereof by application of pressure on the opposite sides of the piston so that it is not free to move axially of the cylinder 13 once the table reaches approximately the desired position. Final positioning of the table takes place under control of electromechanical means hereinafter described. The hydraulic power traverse of the table takes place substantially throughout the full travel thereof to approximately the desired position and the final accurate or fine positioning, which is accomplished electromechanically, is carried out by moving the table only a short distance, preferably in the order of millimeters or a fraction of one. In order to carry out precise or fine positioning of the table in operational positions a reversible electric motor 34, controlled by an electrical control circuit 32, is provided for rotatably driving the shaft 30 thereby to rotate the gear 27, which indirectly drives the nut 19 to move the table 11 to its final desired position. The motor 34 may be constructed to run selectively at two or more different speeds to allow the final positioning of the table 11 to be carried out with more or less speed depending on the distance to travel in final positioning and the precision required. Of course this object may be achieved by providing another gearing having a ratio different from that including gears 39 through 49.

Mechanism is provided for coupling the motor 34 selectively to the shaft 30 comprising a drive illustrated as a drive belt 36 for rotatably driving a shaft 38 having a worm 39 cooperative with a worm gear 40 fixed on a rotatable shaft 41 to which is connected a bevel gear 42 cooperative with a bevel gear 43 to drive a shaft 45 and another gear 47 engaging a gear 49. The shaft 30 is coupled to the gear 49 through an electromagnetic clutch 54.

The rotatable shaft 30 further is provided with a bevel gear 56 driven by a bevel gear 58 fixed on the shaft 38 thereby to rotatably drive the shaft 30. The shaft 30 is selectively coupled to the gear 56 through a second electromagnetic clutch 60 selectively energized by the control circuit 32 when the other electromagnetic clutch 54 is de-energized by the control circuit.

The electromechanical drive means heretofore described provide for the final portion of the traverse movement of the table 11 for accurate or precise positioning thereof by slowly driving the nut 19 under control of the electrical control circuit 32 which is actuated to energize the motor 34 once the hydraulic portion of the traverse power stroke is finished and to electrically energize the electromagnetic clutch 54 and de-energize the clutch 60 so that power transmission is accomplished through the worm gear 40 heretofore described and associated gears which constitute the fine positioning means. It will be understood that the motor 34 will be de-energized once the table 11 is accurately positioned by rotation of the shaft 30 and resultant rotation of the micrometric nut 19 which is coupled to the table for moving it to its terminal or operative positions.

According to the invention an alternative fine positioning mechanism is provided for manually completing the traverse of the table subsequent to the automatic hydraulic power traverse thereof by use of manual means so that the machine operator can position the table as desired independently of the electromechanical mechanism as heretofore described. Accordingly, a hand wheel 65 for rotatably driving a bevel gear pair 66, 67 is provided on the side of the machine. The gear 67 of the gear pair drives a shaft 68 which is operably coupled to the shaft 30 through an electromagnetic clutch 70 when it is energized.

The control circuit electrically energizes electromagnetic clutch 70 and de-energizes the electromagnetic couplings 54, 60 when the final positioning is to take place under manual control of the wheel 65. An electromagnetic brake 71 connected to the control circuit locks the manual control when the table 11 is being traversed under control of the hydraulic and electromagnetic mechanisms heretofore described. Moreover, the electromagnetic clutch 70 is de-energized by the control circuit when the shaft 30 is being rotatably driven by the electromechanical mechanism heretofore described and the table is traversed in part under hydraulic control.

Although each traverse movement of the table 11 under control of the electromechanical mechanism and nut 19 is a comparatively short distance when compared with the overall travel of the table, it is readily apparent that even though the directions of movement of the table are not always in the same direction there is some probability that the nut 19 will have accruing movements in one direction so that it would be in a position to become jammed by movement in a given direction once one of the ends of the thread 18 is reached. According to the invention means are provided in order to preclude locking or jamming of the nut on the piston rod 17 which could conceivably result in breaking of the mechanical drive connections in the fine electromechanical mechanism for positioning the table accurately.

The safety means eliminates the risk of such mishaps and constitutes restoration mechanism for returning or restoring the nut 19 to a median position on the thread 18 after the nut has reached one of two extreme or terminal positions on opposite sides of the median position on the thread and axially spaced therefrom. These terminal positions are spaced inwardly from the ends of the thread 18 a few millimeters and define a range of positions in which the nut is permitted to travel. Further means are provided to indicate that the nut has reached one of its terminal positions.

The restoration mechanism comprises a gear 73 fixedly secured to the shaft 30 and an arrangement of four cams 75, 76, 78, 79 keyed or otherwise fixed to a common shaft 80 which is operably connected to the shaft 30 through a gear 82 in engagement with the gear 73. The restoration mechanism is constructed such that the nut 19 and the shaft 80 have a given ratio of rotation. The shaft 80 and, therefore, the cams are fixed thereon execute angular rotation through about 270° whenever the nut moves over the range of axial positions between the two above-mentioned extreme positions on the thread 18.

The cams are operably connected to the electrical control system by means of respective switches 75'–79' actuated by respective cam followers 75'a–79'a. The switches are illustrated diagrammatically as being angularly spaced in FIG. 3 to illustrate operation of the restoration mechanism. The switches 75', 76' are electrically connected to the control system 32 to which a visual signal means is connected consisting of a signalling light 85 mounted on the control board of the jig borer. These two switches 75', 76' are generally in an open position and the respective cams actuating them have their respective camming surfaces arranged and configured to actuate a respective switch whenever the nut 19 passes a certain point in a given direction of travel toward either one of the extreme limits to which the switches correspond respectively. When the particular point is passed the particular or respective switch is closed and the control system causes the light 85 to blink and subsequently when the extreme limit is passed the light remains continuously on indicating a danger signal to the machine operator.

The camming surfaces of the cams 78, 79 are angularly positioned relative to each other to carry out control of the reversible motor 34 through the control system whenever a corresponding terminal limit of travel of the nut 19 is reached by it. When the nut 19 is in the section of the thread between the two extreme limits the switches 75', 76' are open and the signal bulb 85 is deenergized. And as aforementioned when the nut enters one of the areas approximating the terminal limit the proper one of the switches 75', 76' is closed and the warning signal bulb is intermittently energized so that it blinks thereby warning the operator. However, the nut 19 should not actually reach the final extreme position of the range of travel permitted since once the workman sees the bulb blinking he can preclude overtravel of the nut. Thus, if the signal is blinking or is in a steady state condition, which indicates the nut is past the limit of travel, the operator can depress a pushbutton 86 mounted on a control board of the machine. This button is connected to the electrical control circuit and starts the motor 34 rotating in a direction to return the nut to the median position.

The direction of travel of the motor is controlled by the switches 78', 79' which are respectively actuated by the camming surfaces of the control cams 78, 79. These switches are connected to the electrical control circuit and the camming surfaces of these two control cams are so configured and so disposed relative to each other when the nut reaches a respective one of the terminal positions a respective switch 78', 79' is closed to permit energization of the motor 34 in a condition for rotating the shaft 30 in the proper direction to return the nut to its median position. The rotary driving of the shaft 30 is transmitted to the nut 19 which is returned, at a relatively high speed, to its median position where it stops as a consequence of the stopping of the motor which is switched off through the operation of one of the cam operated switches 78', 79' whichever has been closed and is then opened in view of the fact that the rotation of the shaft 30 moves the cams 78, 79 into an angular position for de-energizing the motor.

The safety control switch 86 also controls the energization of electromagnetic clutch 60 so as to engage with gear 56 thereby to drive the shaft 30 under control of the motor 34 and the electromagnetic clutch 54 is de-energized to separate shaft 30 from the gearing including the gears 39 through 49.

It is apparent to those skilled in the art that automatic operation of the nut returning or nut restoring mechanism which is essentially safety mechanism can be accomplished, for example through a switch disposed in the control circuit energizing the motor 34 so as to close the circuit under control of the control lever 31 instead of being actuated by the pushbutton 86 so that for each movement of the table 11 the nut 19 may be returned toward its median position on the thread portion 18. Moreover, it is readily apparent to those skilled in the art that the cams 75, 76 can be constructed as a single cam by proper configuration and positioning of the camming surfaces as well as proper positioning of the respective switches.

While a preferred embodiment of the invention has been shown and described it will be understood that many modifications and changes can be made within the true spirit and scope of the invention.

What I claim is:

1. In a machine tool having a first traversable member, means selectively operable for selectively traversing said first member and positioning it comprising a reciprocably-driven second member, a rod secured to said second member, a threaded nut disposed for traveling axially on said rod between two axially spaced limit positions on said rod for selectively moving said traversable member and positioning said traversable first member independently of said means for reciprocably traversing said traversable member, means for selectively reversibly rotatably driving said nut on said rod for controllably progressing its axial travel on said rod, means cooperative with the last-mentioned means to sense the axial position of said nut, and safety means cooperative with said sensing means and effective independently of said means for progressing said nut to reverse direction of travel of said nut when it reaches one of said limit positions and effective to rapidly position said nut axially spaced axially inwardly from said axial limit positions substantially at a median position therebetween, said rod having a threaded axial portion on which said nut travels, said threaded portion having end terminal positions and said limit positions being spaced axially inwardly from respective ones of said end terminal positions on said thread and adjacent thereto, whereby said safety means precludes jamming of said nut at said end terminal positions when rendered effective, and said means to sense having means for rendering said safety means effective when said nut reaches one of said limit positions.

2. In a machine tool having a traversable member, means selectively operably for selectively traversing said member and variable positioning it comprising a reciprocably-driven, hydraulically-operated piston, a rod secured to said piston, a threaded nut disposed for traveling axailly on said rod between two axially spaced limits on said rod for selectively moving said tranversable member and positioning said traversable member independently of said means for reciprocably traversing said traversable member, means for selectively reversibly rotatably driving said nut on said rod for controllably progressing its axial travel on said rod, means cooperative with the last-mentioned means to sense the axial position of said nut, safety means cooperative with said sensing means and effective independently of said means for progressing said nut to reverse direction of travel of said nut when it reaches one of said limits and effective to rapidly position said nut axially spaced inwardly from said axial limits substantially at a median position therebetween, said rod having a threaded axial portion on which said nut travels, said theraded portion having end terminal positions and said limits being spaced axially inwardly from respective ones of said end terminal positions on said thread and adjacent thereto, whereby said safety means precludes jamming of said nut and said end terminal positions when rendered effective, and said means to sense having means for rendering said saftey means effective in response to said nut reaching one of said limits.

3. In a machine tool having a first traversable member, means selectively operable for selectively traversing said first member and variably positioning it at different positions comprising a reciprocably-driven piston, a rod secured to said piston, a threaded nut disposed for traveling axially on said rod between two axially spaced limits on said rod for selectively moving said traversable member and positioning said traversable member independently of said means for reciprocably traversing said traversable member, means for selectively reversibly rotatably driving said nut on said rod for controllably progressing its axial travel on said rod, means cooperative with the last-mentioned means to sense the axial position of said nut, means rendered effective by said means to sense for indicating when said nut reaches one of said limits, safety means cooperative with said sensing means and effective independently of said means for progressing said nut to reverse direction of travel of said nut when it reaches one of said limits and effective to rapidly position said nut axially spaced axially inwardly from said axial limits substantially at a median position therebetween, said rod having a threaded axial portion on which said nut travels, said threaded portion having end terminal positions and said limits being spaced axially inwardly from respective ones of said end terminal positions on said threads and adjacent thereto, whereby said safety means precludes jamming of said nut at said terminal positions when rendered effective, and means for rendering said safety means effective when said nut reaches one of said limits.

References Cited in the file of this patent

UNITED STATES PATENTS

| 2,068,199 | Seletsky | Jan. 19, 1937 |
| 2,114,389 | Kingsbury | Apr. 19, 1938 |
| 2,239,625 | Roehm et al. | Apr. 22, 1941 |
| 2,587,352 | Manning | Feb. 26, 1952 |
| 2,809,736 | Hoover | Oct. 15, 1957 |
| 3,071,028 | Wagner | Jan. 1, 1963 |